(12) United States Patent
Wansley et al.

(10) Patent No.: US 9,355,640 B2
(45) Date of Patent: May 31, 2016

(54) INVOKING ACTION RESPONSIVE TO CO-PRESENCE DETERMINATION

(71) Applicant: Google Inc., Mountain View, CA (US)

(72) Inventors: Andrew Theodore Wansley, San Francisco, CA (US); Amay Nitin Champaneria, San Francisco, CA (US)

(73) Assignee: Google Inc., Mountain View, CA (US)

( * ) Notice: Subject to any disclaimer, the term of this patent is extended or adjusted under 35 U.S.C. 154(b) by 91 days.

(21) Appl. No.: 14/296,405

(22) Filed: Jun. 4, 2014

(65) Prior Publication Data

US 2015/0356973 A1 Dec. 10, 2015

(51) Int. Cl.
| | |
|---|---|
| *G10L 17/00* | (2013.01) |
| *H04M 1/67* | (2006.01) |
| *G06Q 10/10* | (2012.01) |
| *H04M 1/725* | (2006.01) |
| *H04W 4/02* | (2009.01) |

(52) U.S. Cl.
CPC ............ *G10L 17/005* (2013.01); *G06Q 10/109* (2013.01); *H04M 1/67* (2013.01); *H04M 1/72569* (2013.01); *H04W 4/023* (2013.01); *G10L 17/00* (2013.01)

(58) Field of Classification Search
CPC ....... G10L 13/033; G10L 13/04; G10L 13/10; G10L 15/07; G10L 15/22; G10L 15/28; G10L 17/005; G10L 17/24; G10L 17/00; G10L 21/00; G10L 21/0272; G06F 17/30743; H04L 63/0861; H04L 67/306; H04M 1/67; H04M 2250/74; H04W 12/06
USPC ............... 704/246, 249, 273; 455/411, 414.1; 340/989.6; 726/16, 17, 18, 19; 713/182, 183, 185, 186, 184
See application file for complete search history.

(56) References Cited

U.S. PATENT DOCUMENTS

| | | | |
|---|---|---|---|
| 6,389,397 B1 | 5/2002 | Otto | |
| 8,452,597 B2 | 5/2013 | Bringert et al. | |
| 8,543,834 B1 * | 9/2013 | Barra ...................... | G06F 21/32 713/182 |
| 8,959,360 B1 * | 2/2015 | Barra ...................... | G06F 21/32 455/411 |
| 9,117,451 B2 * | 8/2015 | Fructuoso ............... | G10L 13/04 |

(Continued)

FOREIGN PATENT DOCUMENTS

WO 2013009296 1/2013

OTHER PUBLICATIONS

International Search Report and Written Opinion of PCT Serial No. PCT/US2015/34082 Sep. 4, 2015.

*Primary Examiner* — Vijay B Chawan
(74) *Attorney, Agent, or Firm* — Middleton Reutlinger

(57) ABSTRACT

Methods, apparatus and computer-readable media (transitory and non-transitory) are disclosed for receiving audio information based on sensing of one or more audible sounds; identifying one or more voice profiles, wherein each of the voice profiles is associated with an individual and indicates one or more voice characteristics of the associated individual; determining at least a given voice profile of the one or more voice profiles matches the audio information; determining co-presence of the user with at least the individual associated with the given voice profile based on determining the given voice profile matches the audio information; identifying an action that includes a trigger based on co-presence of the user and the individual associated with the given voice profile; and invoking the action based on the determined co-presence of the user with at least the individual associated with the given voice profile.

24 Claims, 4 Drawing Sheets

(56) References Cited

U.S. PATENT DOCUMENTS

2009/0102676 A1* 4/2009 Hoffmann .............. G08B 21/24
                                                340/686.6
2013/0132092 A1* 5/2013 Cabezas ................. G06F 21/64
                                                704/273
2014/0079248 A1* 3/2014 Short .................. G10L 27/0272
                                                381/119
2014/0162613 A1* 6/2014 Lukose ............. G06F 17/30743
                                                455/414.1
2014/0236598 A1* 8/2014 Fructuoso ............... G10L 13/04
                                                704/249

* cited by examiner

INVOKING ACTION RESPONSIVE TO CO-PRESENCE DETERMINATION

BACKGROUND

Users may configure electronic devices such as smart phones to provide the users with reminders and other notifications. These reminders and notifications are often triggered by a date and/or time associated with a calendar event and/or task. For example, a user may create a calendar entry for a "meeting" at 2:30 on Friday. The user's phone may provide a reminder, e.g., in the form of audio and/or visual notification, at the time of the meeting or at some predetermined time interval before the meeting. Some users may desire notifications in response to cues other than date and/or time-based triggers.

SUMMARY

This specification is directed generally to methods and apparatus for determining co-presence of a user with one or more other individuals using audible sounds. The audible sounds may be captured by, for instance, the user's mobile device. One or more actions may be selected that include triggers based on a determination of co-presence of the user with the one or more individuals. The selected actions may be invoked, e.g., a notification may be provided to the user, e.g., using the user's mobile device, in response to a determination of co-presence made based on the captured audible sounds.

In some implementations, a method is provided that includes the steps of: receiving audio information from a client device of a user, the audio information based on sensing of one or more audible sounds by the client device; identifying one or more voice profiles, wherein each of the voice profiles is associated with an individual and indicates one or more voice characteristics of the associated individual; determining at least a given voice profile of the one or more voice profiles matches the audio information; determining co-presence of the user with at least the individual associated with the given voice profile based on determining the given voice profile matches the audio information; identifying an action that includes a trigger based on co-presence of the user and the individual associated with the given voice profile; and invoking the action based on the determined co-presence of the user with at least the individual associated with the given voice profile.

These methods and other implementations of technology disclosed herein may each optionally include one or more of the following features.

The action may be a reminder of the user. The step of determining the co-presence of the user with at least the individual associated with the given voice profile may be further based on one or more additional indications of co-presence of the user with at least the individual associated with the given voice profile. The method may further include the steps of: identifying user location information associated with the user; and determining the additional indications of co-presence based on the user location information. The method may further include the steps of: identifying individual location information associated with the individual associated with the given voice profile; and determining the additional indications of co-presence based on comparison of the user location information and the individual location information.

The method may further include the steps of: phonetically analyzing the audio information to determine one or more terms of the audible sounds sensed by the client device; and determining the additional indications of co-presence based on the one or more terms.

The method may further include the steps of: identifying one or more signals indicative of potential co-presence of the user with one or more individuals; wherein the step of receiving the one or more audible sounds by the client device may be triggered in response to identifying the one or more signals. The method may further include the steps of: providing an audio information request to the client device based on identifying the one or more signals; and receiving the audio information from the client device in response to the audio information request. The one or more signals indicative of potential co-presence of the user with one or more individuals may be identified at the client device. The one or more signals may include one or more contextual signals indicative of one or more of a location of the user, an activity of the user, a current time, and a current date.

Each of the voice profiles may be associated with an authorization permitting access by the user. The audio information may include an abstraction of the audible sounds sensed by the client device. The step of determining at least the given voice profile matches the audio information may include the step of determining similarity between the one or more voice characteristics of the given voice profile and the audio information.

The step of identifying the action that includes the trigger based on co-presence of the user and the individual associated with the given voice profile may include the steps of: identifying the trigger based on co-presence of the user and a class of individuals; and determining the individual associated with the given voice profile is a member of the class of individuals.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
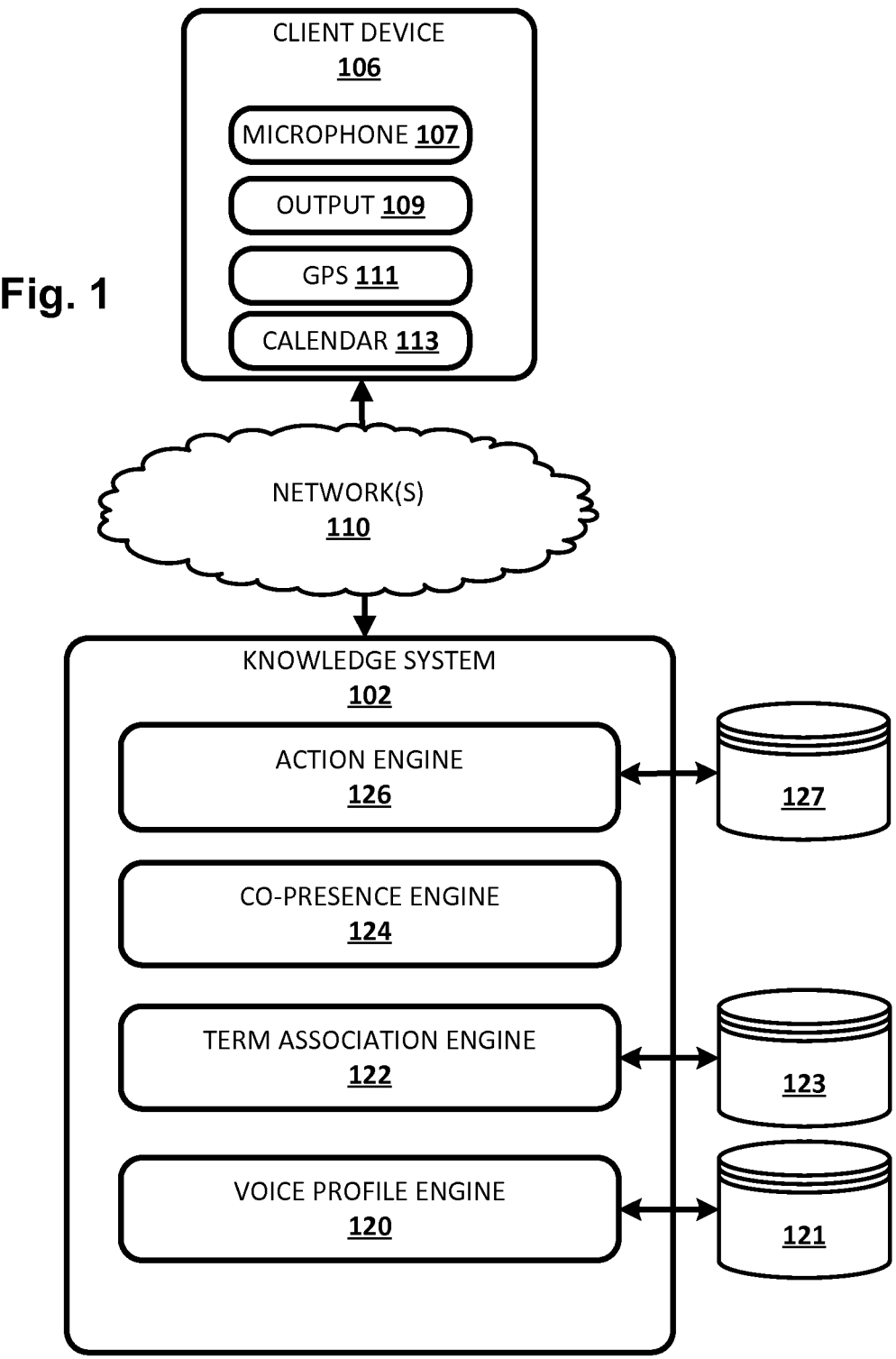
FIG. 1 illustrates an example environment in which actions may be invoked in response to various cues, such as determinations of co-presence.

FIG. 1 illustrates an example environment in which an action may be invoked in response to various cues, such as determination of co-presence. For example, in some implementations notifications may be provided in response to various cues, such as determinations of co-presence. The example environment includes a client device 106 and a knowledge system 102. Knowledge system 102 may be implemented in one or more computers that communicate, for example, through a network (not depicted). Knowledge system 102 is an example of a system in which the selected aspects of systems, components, and techniques described herein may be implemented and/or with which systems, components, and techniques described herein may interface.

A user may interact with knowledge system 102 via client device 106 and/or other computing systems (not shown). Client device 106 may be a computer coupled to the knowledge system 102 through one or more networks 110 such as a local area network (LAN) or wide area network (WAN) such as the Internet. The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. While the user likely will operate a plurality of computing devices, for the sake of brevity, examples described in this disclosure will focus on the user operating client device 106.

Client device 106 may operate one or more applications and/or components which may relate to provision of notifications to users, as well as provide various types of signals. These application and/or components may include but are not limited to a microphone 107, output device 109, position coordinate component, such as a global positioning system ("GPS") component 111, a calendar component 113, and so forth. In some instances, one or more of these applications and/or components may be operated on multiple client devices operated by the user. Other components of client device 106 not depicted in FIG. 1 that may provide signals include but are not limited to barometers, Geiger counters, cameras, light sensors, presence sensors, thermometers, health sensors (e.g., heart rate monitor, glucose meter, blood pressure reader), accelerometers, gyroscopes, and so forth.

In some implementations, output device 109 may include one or more of a speaker (or speakers), a screen, a touch screen, one or more notification lights (e.g., light-emitting diodes), a printer, and so forth. As will be described herein, in some implementations output device 109 may be used to render, e.g., as output, one or more notifications in response to a determination of co-presence between a user and one or more other individuals. Also, in some implementations output device 109 may be used to provide output based on one or more other actions invoked in response to a determination of co-presence such as actions of opening an app, playing a song, sending an e-mail or text message, taking a picture, etc.

Client device 106 and knowledge system 102 each include one or more memories for storage of data and software applications, one or more processors for accessing data and executing applications, and other components that facilitate communication over a network. The operations performed by client device 106 and/or knowledge system 102 may be distributed across multiple computer systems. Knowledge system 102 may be implemented as, for example, computer programs running on one or more computers in one or more locations that are coupled to each other through a network.

In some implementations, client device 106 may be configured to sense one or more audible sounds, e.g., using microphone 107, and may provide audio information based on the sensed one or more audible sounds (also referred to as "audio input") to various other components. Those other components, examples of which are described in more detail below, may perform various operations based on the audio information to identify one or more voice profiles, associated with one or more individuals, that match the audio information. In various implementations, audio information may include: a raw recording of one or more individuals that are speaking; a compressed version of a recording; indications of one or more features of audio input obtained via microphone 107 of client device 106 such as pitch, tone, frequencies, and/or volume; and/or a transcript of audio input obtained via microphone 107.

In various implementations, knowledge system 102 may include a voice profile engine 120, a term association engine 122, a co-presence engine 124, and/or an action engine 126. In some implementations one or more of engines 120, 122, 124, and/or 126 may be omitted. In some implementations all or aspects of one or more of engines 120, 122, 124, and/or 126 may be combined. In some implementations, one or more of engines 120, 122, 124, and/or 126 may be implemented in a component that is separate from knowledge system 102. In some implementations, one or more of engines 120, 122, 124, and/or 126, or any operative portion thereof, may be implemented in a component that is executed by client device 106.

Voice profile engine 120 may be configured to match audio information, e.g., received from client device 106, to at least one voice profile in an index 121 of voice profiles. In various implementations, a "voice profile" may include voice information about an associated individual that may be utilized to determine whether audio information includes the voice of the individual. In some implementations, a voice profile may indicate one or more voice characteristics of an associated individual. In some implementations, a voice profile may be a spectrogram of a voice, also known as a "voiceprint."

In some implementations, an individual may provide permission for one or more other users to access and/or utilize a voice profile for the individual. For example, an individual may provide one or more users with access to an associated voice profile and may not provide one or more other users with access to the same associated voice profile. In some implementations, voice profiles may include voice identification information for an individual and include, or otherwise be associated with, one or more additional attributes of the associated individual. For example, a voice profile of an individual may include one or more names of the individual, a relationship between the individual and the user, and/or one or more locations that are associated with the individual.

In various implementations, voice profile engine 120 may determine a voice profile that matches audio information, e.g., received from client device 106, based on similarity between the audio information and voice profiles of individuals contained in index 121. In some implementations, a matching voice profile may be determined based on similarities between the audio information and audio characteristics that are included in the voice profiles of the individuals. In various implementations, voice profile engine 120 may employ a variety of speaker recognition techniques to match audio information to one or more voice profiles. These techniques may include but are not limited to frequency estimation, hidden Markov models, Gaussian mixture models, pattern matching algorithms, neural networks, matrix representation, vector quantization, decision trees, as well as "anti-speaker" techniques such as cohort models, world models, and so forth.

In some implementations, audio information may undergo various levels of preprocessing prior to being matched by voice profile engine 120 to one or more voice profiles. This preprocessing may, in some instances, facilitate more efficient voice recognition, e.g., by voice profile engine 120. In various implementations, the preprocessing may be performed by client device 106 or by another component, such as a component of knowledge system 102. In some implementations, voice profile engine 120 itself may preprocess the audio information.

As a non-limiting example of pre-processing, audio information may be initially captured, e.g., by microphone 107 of client device 106, as raw data (e.g., in "lossless" form such as a way file or "lossy" form such as an MP3 file). This raw data may be preprocessed, e.g., by client device 106 or one or more components of knowledge system 102, to extract various information to facilitate voice recognition. In various implementations, this extracted information, which may include an abstraction of audible sounds sensed by client device 106, may serve as "distilled" audio data (with the raw data being discarded or otherwise ignored), or may be used to annotate the raw data. In various implementations, voice profile engine may compare the audio sound abstraction or annotations to one or more characteristics of a voice profile, rather than the originally captured audio information.

As a supplement or alternative to voice profile engine 120, term association engine 122 may maintain an index 121 of terms (e.g., words or phrases) that may be associated with particular individuals that may be available, in whole or in selective part, to various components of knowledge system 102. In various implementations, term association engine 122 may be configured to utilize various speech recognition techniques (e.g., hidden Markov models, dynamic time warping, neural networks, etc.) to phonetically analyze audio information, e.g., provided by client device 106, to determine one or more spoken terms. Term association engine 122 may then perform various actions based on those terms. For example, term association engine 122 may identify one or more individuals that are associated with the identified terms. Term association engine 122 may utilize various resources to associate one or more terms with one or more individuals, including but not limited to contacts, social networks, and so forth.

Suppose a user's phone captures speech of an individual. The individual may use various terms, such as his name or alias, his hobbies, other people's names or nicknames, other people's hobbies, or a favorite catch phrase, that term association engine 122 may associate with an identity of that individual or another. For instance, suppose a user's phone detects one individual posing a question to another individual, such as "Tomas, can you hand me that remote?" The user's phone may provide audio information to term association engine 122, which may identify the term "Tomas" and associate it with a contact of the user named Tomas.

Co-presence engine 124 may be configured to determine co-presence of a user with an individual associated with a voice profile based on a determination, e.g., by voice profile engine 120, that the voice profile matches audio information, e.g., received by client device 106 operated by the user. In some implementations, co-presence engine 124 may further based its determination on one or more additional indications of co-presence of a user with an individual associated with a matched voice profile. As one example, user location information associated with the user may be identified, e.g., using GPS 111 and/or using other hardware or techniques such as those based on cell tower signals, Wi-Fi signals, etc. One or more aspects of the user's location, such as whether it meets particular criteria, may be used as additional indications of co-presence. For instance, co-presence engine 124 may determine that a user is co-present with another individual where the user's GPS coordinates are sufficiently proximate to GPS coordinates obtained from a mobile device operated by the other individual. As another example additional indication of co-presence, in some implementations, terms identified by term association engine 122 may be used to corroborate co-presence.

Action engine 126 may maintain an index 127 of actions, such as audio and/or visual reminders or other similar notifications. In various implementations an action may be associated with or include a trigger that causes action engine 126 to invoke the action (e.g., to provide the notification when the action is a notification). In some implementations, the trigger may be based on co-presence of a user and another individual associated with a voice profile matched by voice profile engine 120. In various implementations, action engine 126 may be configured to invoke the action based on the determined co-presence of the user with at least the individual associated with the given voice profile. In some implementations, action engine 126 and/or index 127 may be implemented in whole or in part on client device 106. For example, a user may operate client device 106 to create various notifications the user would like to receive in response to various events, such as occurrence of a selected date/time, arrival at a particular location (e.g., "remind me to do laundry when I get home"), or a determination of co-presence of the user with one or more other individuals (or classes of individuals, e.g., "remind me to collect dues when co-present with a member of our club"). Also, for example, client device 106 may invoke additional and/or alternative actions in response to various events, such as occurrence of a selected date/time, arrival at a particular location, or a determination of co-presence of the user with one or more other individuals. For example, based on co-presence of the user with one or more other individuals, client device 106 may open an app, may play a song (e.g., happy birthday when co-presence is detected with an individual with a birthday), may send an email or text message (e.g., to an individual when co-presence is detected with one or more other individuals), and/or take a picture.

In this specification, the term "database" and "index" will be used broadly to refer to any collection of data. The data of the database and/or the index does not need to be structured in any particular way and it can be stored on storage devices in one or more geographic locations. Thus, for example, the indices 121, 123, and/or 127 may include multiple collections of data, each of which may be organized and accessed differently.

In various implementations, action engine 126 may additionally or alternatively be configured to identify a notification (or other action) that includes a trigger based on co-presence of the user and a class of individuals. For example, action engine 126 may determine that an individual associated with a voice profile matched by voice profile engine 120 to audio information is a member of a class of individuals (e.g., teammates, co-workers, friends, colleagues, etc.). Based on that determination, action engine 126 may identify and/or provide one or more notifications to the user that is appropriate given the user's presence with a member of the class (or invoke another action that is appropriate).

For instance, a user may configure client device 106 to provide a notification (e.g., a text message or notification, "don't forget to collect yearly dues") whenever the user is co-present with any member of the user's club or organization. To this end, client device 106 and/or knowledge system 102 may store identifying information about members of the user's club or organization in various locations. Voice profiles associated with the members may be stored in index 121. Additionally or alternatively, terms used by or otherwise associated with the members may be stored in index 123. When co-presence engine 124 determines co-presence of the user with an individual having an associated voice profile stored in index 121, action engine 126 may determine whether that individual associated with that voice profile is also a member of the user's club or organization. If so, action engine 126 may provide the user with a notification that is pertinent to how the user interacts with any member of the club or organization.

In various implementations, action engine 126 may identify an action with multiple triggers. This action may be invoked when any one of the triggers is satisfied (e.g., when the user is co-present with the individual or when the user is at a particular location), or when all triggers have been satisfied (e.g., when the user is co-present with the particular individual at the particular location).

Figure 2:
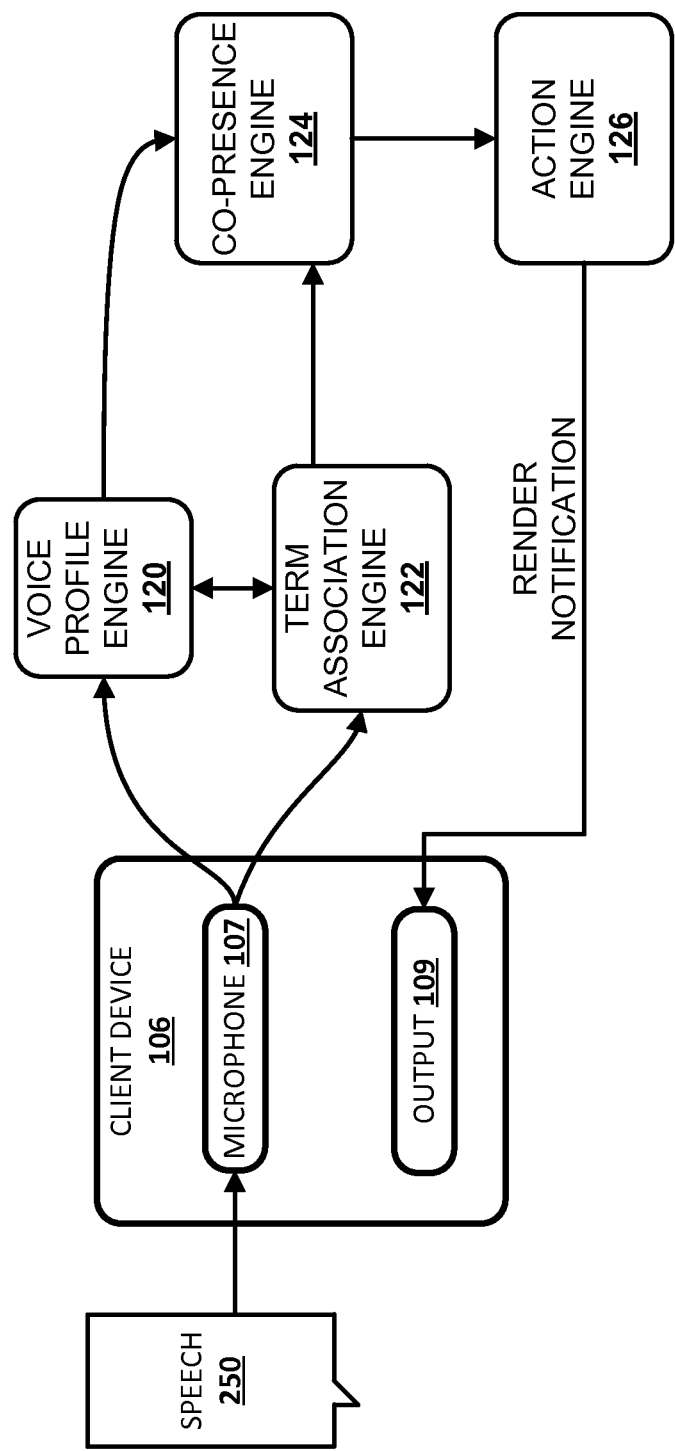
FIG. 2 illustrates one example of how a notification may be provided in response to a determination of co-presence.

FIG. 2 schematically depicts one example of how audible speech 250 may be captured and processed to determine co-presence, as well as how one or more notifications may be provided in response to co-presence determination. In FIG. 2, speech 250 is first detected by microphone 107 of client device 106. However, this is not meant to be limiting. Speech 250 may be captured by any pressure wave sensor (e.g., acoustic-to-electric transducer) operated by or associated with a user, such as a microphone in the user's home, office, and/or car. Additionally, the pressure wave sensor need not be a standalone microphone. In various implementations, it may be integral with a smart phone, with a video camera (e.g., a security camera), and so forth. Once captured, speech 250 may be represented as audio information in various forms, e.g., in raw data form, raw data with annotations, abstraction of audible sounds, etc.

In instances where speech 250 is captured by client device 106, constantly operating microphone 107 may drain a battery (not depicted) of client device 106. Accordingly, in various implementations, microphone 107 may be activated, e.g., by client device 106, in response to various signals, such as events and/or stimuli. Some of these signals may be indicative of potential co-presence of the user with one or more individuals. These signals may be identified, e.g., by client device 106 or knowledge system 102, and may trigger activation of microphone 107 to record speech 250.

For instance, in some implementations, knowledge system 102 may identify one or more signals indicative of potential co-presence of the user with one or more individuals (e.g., the user has a meeting with another individual), and may provide an audio information request to client device 106 in response. That audio information request may cause client device 106 to activate microphone 107, so that microphone 107 may capture speech 250. In other implementations, client device 106 itself may identify the one or more signals indicative of potential co-presence of the user with one or more individuals. For instance, client device 106 may utilize one or more contextual signals indicative of an activity of the user to determine that the user is potentially co-present with one or more individuals. For instance, if the user's client device 106 determines, e.g., from calendar 113, that the user is scheduled to be at soccer practice, the user's client device 106 may activate microphone 107 to capture speech 250. In yet other implementations, microphone 107 may be manually activated by a user, e.g., using voice-activation or by simply pressing a button or graphical element rendered on a touch screen. In some implementations, other signals that may or may not be indicative of co-presence may also trigger activation of microphone, such as a user operating one or more applications on client device 106 (e.g., updating a social network status, drafting a text or email, surfing the web, etc.).

In some implementations, audio information captured at client device 106 (or elsewhere) may be provided to voice profile engine 120. As described above, voice profile engine 120 may utilize various speaker recognition techniques to identify one or more voice profiles that match the audio information. Voice profile engine 120 may provide various types of information as output. In some implementations, voice profile engine 120 may provide an indication of one or more identities of one or more individuals associated with one or more voice profiles matched by voice profile engine 120 with audio information representing speech 250.

In some implementations, audio information captured at client device 106 (or elsewhere) may be additionally or alternatively be provided to term association engine 122. As described above, term association engine 122 may utilize various speech recognition techniques to identify one or more terms contained in speech 250. Term association engine 122 may associate those identified terms with one or more individuals, and may provide as output an indication of those associated individuals.

As indicated by the double-headed arrow between them, in various implementations, each of voice profile engine 120 and term association engine may use output of the other to corroborate its own conclusions. For instance, voice profile engine 122 may identify a particular speaker with an associated level of confidence (e.g., as a percentage and/or a value along a range). Output from term association engine 122 indicating that one or more spoken terms in speech 250 is also associable with the particular speaker may raise the level of confidence associated with voice profile engine 120's conclusion. On the other hand, output from term association engine 122 indicating that one or more spoken terms in speech 250 is associable with a different speaker may not affect, or even reduce, the level of confidence associated with voice profile engine 120's conclusion. In some instances, output from term association engine 122 may even contradict voice profile engine 120's conclusion; in such case, a level of confidence associated with voice profile engine 120's conclusion may be reduced.

Output from voice profile engine 120 and/or term association engine 122 may be utilized by co-presence engine 124 to determine co-presence of a user with an individual. For example, co-presence engine 124 may determine co-presence between the user and an individual associated with a voice profile matched by voice profile engine 120 to audio information. As another example, co-presence engine 124 may determine co-presence between the user and an individual identified by term association engine 122 as being associated with one or more terms identified in speech 250. Co-presence engine 124 may output, in various forms, an indication of co-presence of the user with one or more individuals.

Action engine 126 may obtain output of co-reference engine 124 and, based on that output, select, from a plurality of notifications, one that includes a trigger based on co-presence of the user and an individual. Action engine 126 may then cause the selected notification to be provided to a user. For example, action engine 126 may send a "render notification" instruction to client device 106 to cause client device to render the notification using output 109. Or, if action engine 126 is part of client device 106, action engine 126 may simply cause client device 106 to render output using output device 109. As noted above, output device 109 may come in various forms, and therefore, the notification may be rendered in various audio and/or visual forms. For instance, a user may be provided with a pop-up notification on a touch screen of client device 106, or client device 106 may render an audible tone or other sound to serve to remind the user of something. As also noted above, in some implementations action engine 126 may invoke additional or alternative actions besides notifications.

Figure 3:
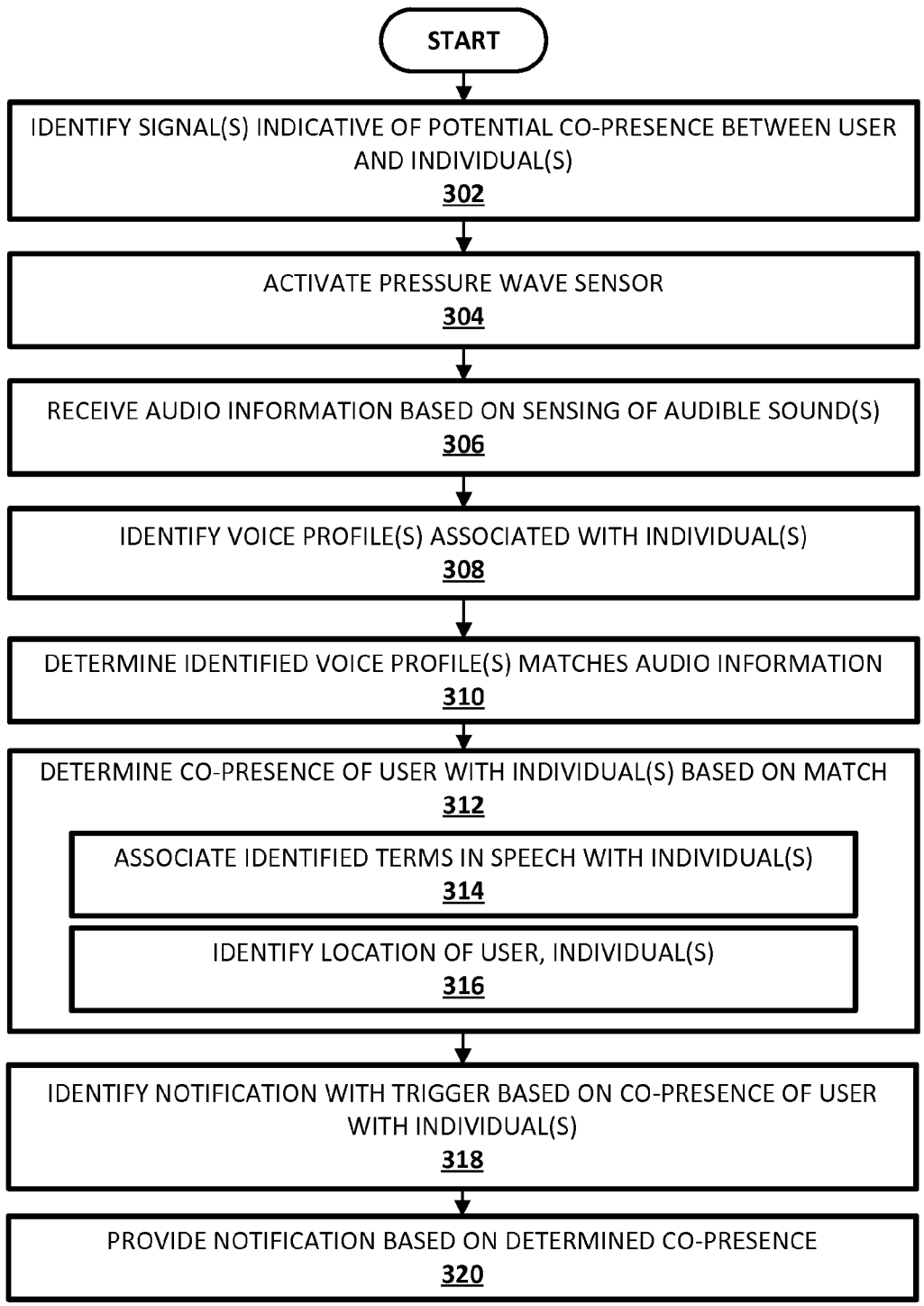
FIG. 3 is a flow chart illustrating an example method of providing a notification responsive to a determination of co-presence.

FIG. 3 schematically depicts an example method 300 of determining co-presence of a user with one or more individuals, and providing notification to the user in response. For convenience, the operations of the flow chart are described with reference to a system that performs the operations. This system may include various components of various computer systems. For instance, some operations may be performed at the client device 106, while other operations may be performed by one or more components of the knowledge system 102. Moreover, while operations of method 300 are shown in a particular order, this is not meant to be limiting. One or more operations may be reordered, omitted or added.

At block 302, the system may identify one or more signals that may be indicative of potential co-presence of a user with one or more individuals. As noted above, these signals may come in various forms, such as calendar appointments (and dates/times associated therewith), location (e.g., determined using GPS component 111), ambient noises, wireless communications (e.g., near field communication ("NFC") received at client device 106 when user passes NFC tag at entryway of building), visual cues (e.g., reading of QR code), other contextual cues (e.g., temperature reading, one or more gestures or motions made with client device 106), user operation of one or more applications (e.g., updating social network status, sending email, talking on phone, recording video, taking picture, etc.) on client device 106, and so forth. These signals may be identified by client device 106 or by knowledge system 102.

At block 304, the system may activate or cause activation of a pressure wave sensor, such as microphone 107 on client device 106, in response to identification of the one or more signals at block 302. If the signal was identified by client device 106, client device 106 may simply activate microphone 107. If the signal was identified by knowledge system 102, a component of knowledge system 102 may provide an audio information request to client device 106. Client device 106 may respond by activating microphone 107.

At block 306, the system may receive audio information based on sensing of audible sound(s), e.g., by microphone 107 of client device 106. As noted above, this audio information may be represented in various forms, including raw audio data, annotated audio data, abstractions of one or more features of captures audible sound(s), and so forth. At block 308, the system may identify one or more voice profiles that are associated with one or more individuals. At block 310, the system may determine whether any of the voice profiles identified at block 308 match the audio information received at block 306.

Assuming there is at least one match, at block 312, the system may determine co-presence of the user with one or more individuals associated with the one or more voice profiles matched to the audio data at block 310. In some implementations, the system may consider additional signals to determine co-presence. For example, at block 314, the system may associate one or more terms identified in speech (e.g., by term association engine 122) with one or more individuals. As another example, at block 316, the system may identify a location of the user and/or a location of one or more individuals, e.g., those individuals associated with voice profiles matched at block 310. These additional signals may corroborate and/or raise a confidence measure associated with a co-presence determined at block 312.

At block 318, the system may identify one or more notifications, e.g., in index 127, that have triggers based on co-presence of the user with one or more individuals. As described herein, in some implementations the system may identify one or more actions that are in addition to, or as an alternative, to one or more notifications. At block 320, the system may provide one or more of the notifications identified at block 318 to the user based on the co-presence of the user with one or more individuals determined at block 312. As described herein, in some implementations the system may invoke additional or alternative actions besides notifications.

Figure 4:
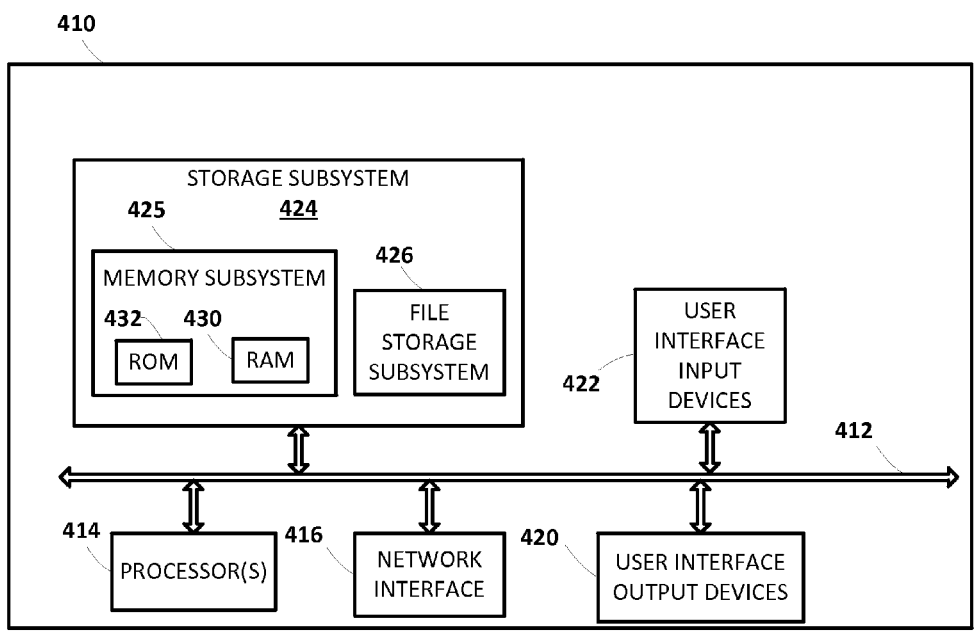
FIG. 4 illustrates an example architecture of a computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420, which in some implementations may correspond to output device 109 in FIG. 1, may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, as well as one or more of the operations performed by voice profile engine 120, term association engine 122, co-presence engine 124, action engine 126, and so forth.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
   identifying one or more signals indicative of potential co-presence of a user with one or more individuals;
   causing a microphone of a client device of the user to be activated to sense one or more audible sounds in response to identifying the one or more signals;
   receiving audio information from the client device, the audio information based on the sensing of the one or more audible sounds by the client device;
   identifying one or more voice profiles, wherein each of the voice profiles is associated with an individual and indicates one or more voice characteristics of the associated individual;
   determining at least a given voice profile of the one or more voice profiles matches the audio information;
   determining co-presence of the user with at least the individual associated with the given voice profile based on determining the given voice profile matches the audio information;
   identifying an action that includes a trigger based on co-presence of the user and the individual associated with the given voice profile; and
   invoking the action based on the determined co-presence of the user with at least the individual associated with the given voice profile.

2. The method of claim 1, wherein the action is a reminder of the user.

3. The method of claim 1, wherein determining the co-presence of the user with at least the individual associated with the given voice profile is further based on one or more additional indications of co-presence of the user with at least the individual associated with the given voice profile.

4. The method of claim 3, further comprising:
   identifying user location information associated with the user; and
   determining the additional indications of co-presence based on the user location information.

5. The method of claim 4, further comprising:
   identifying individual location information associated with the individual associated with the given voice profile; and
   determining the additional indications of co-presence based on comparison of the user location information and the individual location information.

6. The method of claim 3, further comprising:
   phonetically analyzing the audio information to determine one or more terms of the audible sounds sensed by the client device; and
   determining the additional indications of co-presence based on the one or more terms.

7. The method of claim 1, further comprising:
   providing an audio information request to the client device based on identifying the one or more signals; and
   receiving the audio information from the client device in response to the audio information request.

8. The method of claim 1, wherein the one or more signals indicative of potential co-presence of the user with one or more individuals are identified at the client device.

9. The method of claim 1, wherein the one or more signals include one or more contextual signals indicative of one or more of a location of the user, an activity of the user, a current time, and a current date.

10. The method of claim 1, wherein each of the voice profiles is associated with an authorization permitting access by the user.

11. The method of claim 1, wherein the audio information includes an abstraction of the audible sounds sensed by the client device.

12. The method of claim 11, wherein determining at least the given voice profile matches the audio information includes determining similarity between the one or more voice characteristics of the given voice profile and the audio information.

13. The method of claim 1, wherein identifying the action that includes the trigger based on co-presence of the user and the individual associated with the given voice profile includes:
identifying the trigger based on co-presence of the user and a class of individuals; and
determining the individual associated with the given voice profile is a member of the class of individuals.

14. The method of claim 1, wherein the one or more signals indicative of potential co-presence include an attribute of a calendar entry associated with the user.

15. The method of claim 1, wherein the one or more signals indicative of potential co-presence include a social networking status of the user.

16. A system including memory and one or more processors operable to execute instructions stored in the memory, comprising instructions to:
identify one or more signals indicative of potential co-presence of a user with one or more individuals;
activate a pressure wave sensor of the system to sense one or more audible sounds in response to identifying the one or more signals;
generate audio information based on the sensed one or more audible sounds;
identify one or more voice profiles, wherein each of the voice profiles is associated with an individual and indicates one or more voice characteristics of the associated individual;
determine at least a given voice profile of the one or more voice profiles matches the audio information;
determine co-presence of the user with at least the individual associated with the given voice profile based on determining the given voice profile matches the audio information;
identify an action that includes a trigger based on co-presence of the user and the individual associated with the given voice profile; and
invoke the action based on the determined co-presence of the user with at least the individual associated with the given voice profile.

17. The system of claim 16, wherein the action is a reminder of the user.

18. The system of claim 16, wherein the memory further stores instructions to determine the co-presence of the user with at least the individual associated with the given voice profile further based on one or more additional indications of co-presence of the user with at least the individual associated with the given voice profile.

19. The system of claim 18, wherein the memory further stores instructions to:
identify user location information associated with the user or individual location information associated with the individual associated with the given voice profile; and
determine the additional indications of co-presence based on the user location information or the individual location information.

20. The system of claim 18, wherein the memory further stores instructions to:
phonetically analyze the audio information to determine one or more terms of the sensed audible sounds; and
determine the additional indications of co-presence based on the one or more terms.

21. A non-transitory computer-readable medium comprising instructions that, in response to execution of the instructions by a computing system, cause the computing system to perform operations comprising:
activating a pressure wave sensor associated with a user to sense one or more audible sounds in response to one or more non-audio cues indicative of potential co-presence of a user with one or more individuals;
capturing, by the pressure wave sensor, one or more audible sounds;
identifying one or more voice profiles that indicate one or more voice characteristics of one or more individuals;
matching one or more of the identified voice profiles to the captured one or more audible sounds;
determining co-presence of the user with one or more individuals associated with the one or more matched voice profiles;
selecting an action from a plurality of actions, and invoking the selected action, based on the determined co-presence of the user and the one or more individuals.

22. The non-transitory computer-readable medium of claim 21, wherein the action is an audio or visual reminder that is rendered for the user.

23. The non-transitory computer-readable medium of claim 21, wherein determining the co-presence of the user with at least the individual associated with the given voice profile is further based on one or more additional indications of co-presence of the user with at least the individual associated with the given voice profile.

24. The non-transitory computer-readable medium of claim 23, wherein the addition indications of co-presence include one or more of a location of the user, a location of the one or more individuals, and a term used by the one or more individuals that is extracted from the captured one or more sounds using phonetic analysis.

* * * * *